Dec. 9, 1969     R. GÖRIKE     3,483,324
SOUND PICKUP

Filed Sept. 28, 1965     3 Sheets-Sheet 1

INVENTOR.
RUDOLF GÖRIKE
BY
ATTORNEYS

Dec. 9, 1969   R. GÖRIKE   3,483,324
SOUND PICKUP

Filed Sept. 28, 1965   3 Sheets-Sheet 2

INVENTOR.
RUDOLF GÖRIKE
BY *McGlew and Toren*
ATTORNEYS

Figures 9, 10, 11:
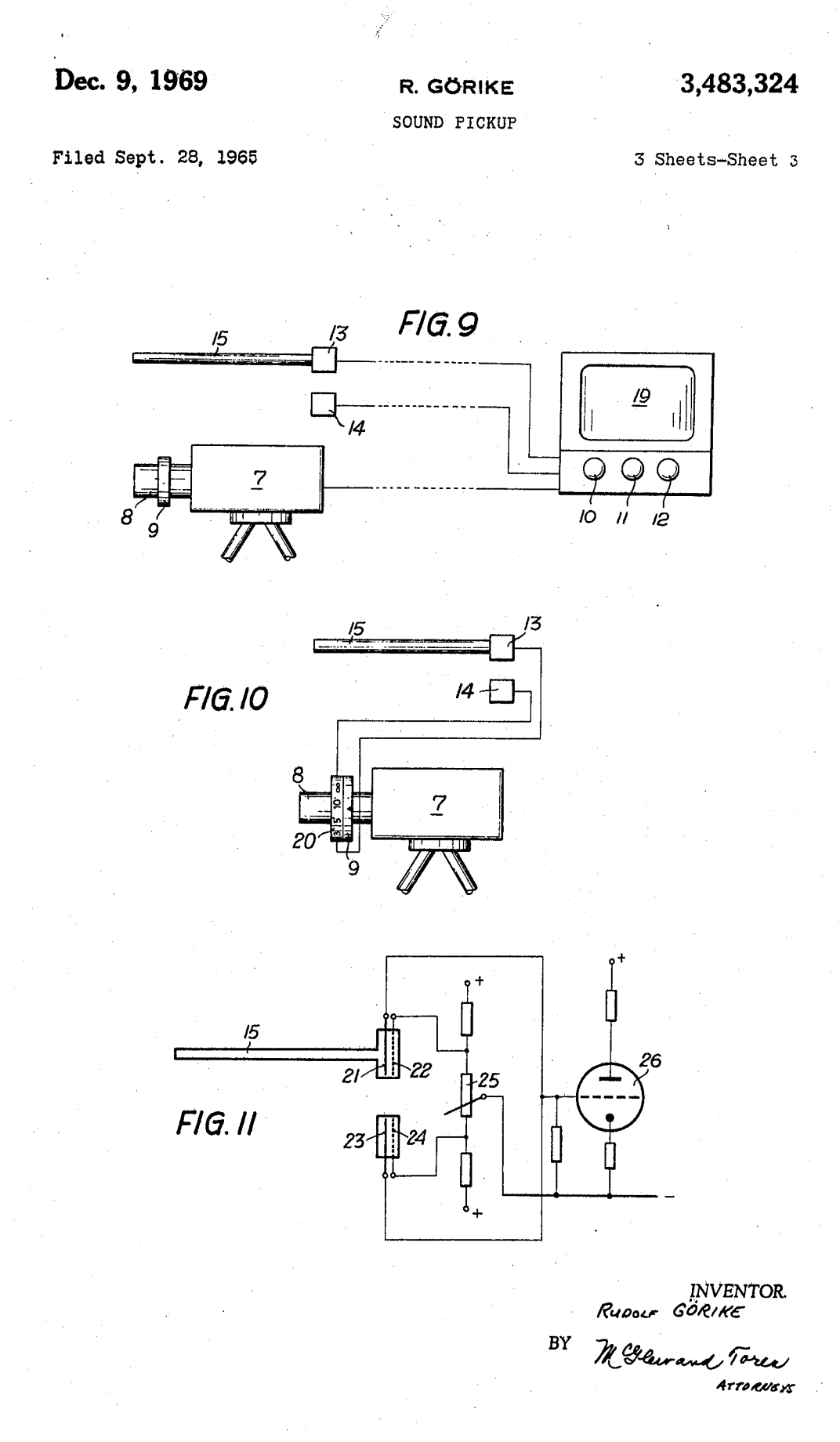

Dec. 9, 1969     R. GÖRIKE     3,483,324
SOUND PICKUP

Filed Sept. 28, 1965     3 Sheets-Sheet 3

INVENTOR.
RUDOLF GÖRIKE

BY *M. Glewrand Toren*
ATTORNEYS

United States Patent Office 3,483,324
Patented Dec. 9, 1969

3,483,324
SOUND PICKUP
Rudolf Görike, Vienna, Austria, assignor to Akustische
u. Kino-Gerate Gesellschaft m.b.H., Vienna, Austria
Filed Sept. 28, 1965, Ser. No. 490,856
Claims priority, application Austria, Oct. 1, 1964,
A 8,368/64
Int. Cl. H04r 21/02
U.S. Cl. 179—1                                18 Claims

ABSTRACT OF THE DISCLOSURE

A microphone arrangement comprises a small-angle microphone having a directional pattern in the form of a lobe defining a small angular field, a wide-angle microphone having an angular field which is larger than, and includes, the angular field of the small-angle microphone, and variable resistance means combining the outputs of the microphones in advance of the input of a common amplifier. The arrangement is useable with a camera, such as a television camera, which may have a zoom lens, and the microphones are mounted on the camera in closely adjacent relation to avoid significant interference between the microphones. The variable resistance means is coupled with the adjusting means for the zoom lens.

---

This invention relates to microphone arrangements particularly for use with cameras. More particularly, the present invention relates to a variable direction pattern microphone arrangement having a zoom sound output corresponding, analogously, to the action of a zoom lens of a camera.

Lenses having a variable focal length, so-called zoom lenses, have been used for some years in motion picture and television cameras. These lenses permit an infinite variation of the angular field of the camera so that different effects can be obtained, which cannot be accomplished with a simple lens. The most important of these effects is the so-called drive effect, which is obtained by adjusting the zoom lens from one end position to the other during a shot, e.g., from the wide-angle setting to the telephoto setting. Whereas the wide-angle setting may result in a general view of the scene, the lens picks up only a detail of the scene when set to the smallest angular field. It will be obvious that, during such a driving shot, the viewer and listener expects also a change of the sound in accordance with the change from the general view to the detail.

To comply with this requirement, it was previously necessary to move a microphone, secure to a boom, to that part of the object which was finally selected in the telephoto setting. This practice is complicated and requires great care to avoid an appearance of the microphone in the picture. For this reason, a continuous acoustic transition was not insisted upon in most cases and a sudden change was tolerated, at least in motion picture shots. In television shots, particularly for live broadcasts, such a sudden change is not possible in most cases because the camera may be directed to objects which are not accessible to the microphone.

It is an object of the invention to eliminate these difficulties and to combine a lens having a variable focal length with an analogous acoustic arrangement so that each setting of the zoom lens may have associated with it a corresponding acoustic sound picture and, in sound recordings, effects similar to those of zoom lenses can be achieved.

Another object of the invention is to provide a microphone arrangement in which the directional pattern can be varied within wide limits, sound interference can be avoided, selected acoustic events can be emphasized, remote sound sources may be picked up and a continuous or sudden change between a wide angular sound field and unidirectional sound field may be made.

A further object of the invention is to provide a microphone arrangement providing, for sound recording, the same advantages attained for picture recordings by the use of lenses having a variable focal length.

Still another object of the invention is to provide a microphone arrangement which may be suitably secured to a stand with the aid of a tilting head so that the microphone arrangement can follow, easily and quickly, the movements of a sound source.

A further object of the invention is to provide a microphone arrangement which may be mounted directly on the picture camera, as, for example, by resilient mountings.

Still another object of the invention is to provide a microphone arrangement in which the directional pattern can be varied within wide limits, and which may be mounted on a boom.

Still a further object of the invention is to provide a microphone arrangement in which the directional pattern can be varied within wide limits, and including a pressure gradient microphone arranged to be switched to an omnidirectional pattern and to permit a transition from an omnidirectional pattern, with an angular field of 360°, to an angular field of only a few degrees.

Yet another object of the invention is to provide a microphone arrangement of the type just mentioned, including a mixing control element and another electrical control element for changing the pattern from omnidirectional to cardioid, and in which the mixing control element and the additional control element may be combined with each other.

Still another object of the invention is to provide a microphone arrangement having a variable directional pattern and comprising at least two individual microphones arranged close to each other and desirably connected through variable electric circuitry to the input of a common amplifier.

A further object of the invention is to provide a microphone arrangement having a variable directional pattern, and including two individual microphones, and in which one of the individual microphones has a directional pattern similar to a slender lobe and the other microphone has a preferably variable angular field which is larger than, and includes, the angular field defined by the lobe.

Still another object of the invention is to provide a microphone arrangement of the type just mentioned in which the microphone having the larger angular field may have either an omnidirectional pattern, a unidirectional pattern, or a pattern which may be changed between an omnidirectional pattern and a unidirectional pattern.

A further object of the invention is to provide a microphone arrangement having a variable directional pattern and comprising at least two individual microphones, and in which a microphone having a directional pattern similar to a slender lobe may be an interference microphone, whereas the other microphone may be a pressure gradient microphone having a cardioid directional pattern.

For an understanding of the principles of the invention, reference is made to the following description of typical embodiments thereof as illustrated in the accompanying drawings.

In the drawings:

FIG. 9 illustrates a microphone arrangement according to the invention in conjunction with a monitor with which is structurally combined the means for controlling the compound directional pattern of the microphone arrangement;

FIG. 10 illustrates a microphone arrangement according to the invention, and which is adapted to be controlled by the control element for determining the focal length of the zoom lens of an associated camera; and FIG. 11 is a schematic circuit diagram illustrating the electrical connection of the microphones to an amplifier.

Figure 1:
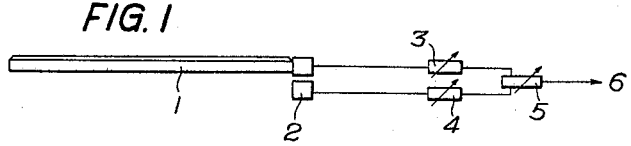
FIG. 1 is diagrammatic view illustrating a microphone assembly according to the invention.

The microphone arrangement according to the invention, as shown in FIG. 1, comprises two individual microphones 1 and 2, both microphones having a unidirectional pattern. The directional pattern of microphone 1 has the form of a slender lobe, i.e. a very small angular field. Such a pattern may be obtained, e.g., by an interference microphone. A microphone of this type is preferably included in the microphone arrangement according to the invention.

Alternatively, a higher-order pressure gradient microphone might be used, but the manufacture of such higher-order pressure gradient microphones is more difficult, particularly as regards a satisfactory frequency response, than is the manufacture of an interference microphone. The latter may consist of a pressure microphone or a pressure gradient microphone, in which the diaphragm is preceded by a directional tube or a combination of such directional tubes. Below the limiting frequency which is defined by the longest interference tube, such microphone has a omnidirectional pattern if it is a pressure microphone, or a cardioid directional pattern if it is a pressure gradient microphone.

The individual microphone 2 has a cardioid directional pattern and consists of a pressure gradient microphone. It may be an electrodynamic microphone or any other type of microphone. Electrodynamic or electrostatic transducers are particularly desirable, especially when combined with a high frequency circuit including a high frequency oscillator and means for modulating the oscillator output with the microphone outputs.

As the individual microphones 1 and 2 are disposed very close to each other, there is virtually no disturbing sound interference between the two microphones. The outputs of the microphones are connected to the control elements 3, 4, which serve for controlling or setting the output voltage of each microphone independently of that of the other. The individual output voltages of the microphones are mixed in a mixing control element 5 (fading control), which is connected by the cable 6 to the microphone amplifier. Electrical amplifiers, which may be suitably transistorized, may be connected between the microphones and the control elements.

Figure 2:
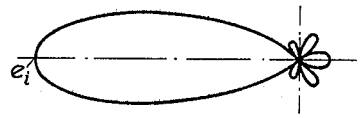
FIGS. 2 to 6 illustrate different directional patterns and different angular fields that may be obtained with this microphone arrangement.

FIG. 2 shows the complete directional pattern of an interference microphone having a tube length 3λ. For the sake of clearness, however, only the main lobe is shown in FIGS. 3 to 6, which illustrate the mode of operation, as the secondary peaks are insignificant for the nature of the invention.

Figure 3:

FIG. 3 shows the directional pattern of a microphone arrangement, according to the invention, with a setting of the microphone output voltages to a ratio of 6:1, the output voltage of the interference microphone being six times higher that of the pressure gradient microphone. The resulting curve is represented by a dotted line. It is apparent that, with this voltage ratio, only an increase in sensitivity in the direction of maximum sensitivity is obtained, whereas the angular field is not appreciably increased.

Figure 4:
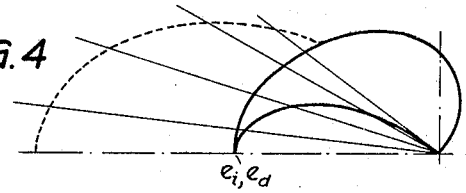
Figure 5:
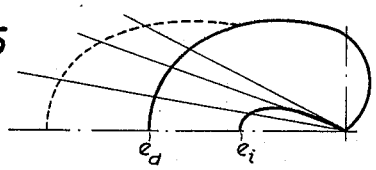
Figure 6:
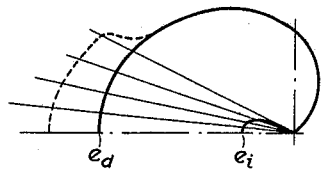

FIG. 4 shows the pattern for a voltage ratio of 1:1. The resulting directional pattern no longer has the form of a slender lobe but rather that of an ellipse which is not very slender. If the voltage ratio is further changed in such a sense that the voltage of the interference microphone is further decreased relative to that of the other microphone, the ellipse becomes increasingly broader, which is equivalent to an increase in the angular field. At a voltage ratio of 1:2 (FIG. 5), a wide-angle setting has been achieved, and at a ratio of 1:4 (FIG. 6) the resulting pattern is almost the same as the directional pattern of the pressure gradient microphone. This composite pattern is generally smooth but has a small extension in the direction of maximum sensitivity. This extension is due to the interference microphone.

In practice, the selection of the maximum ratio between the voltage amplitudes of the two microphones is significant, particularly when the microphone system according to the invention is combined with a zoom lens. As the camera picks up remote objects when it has a large focal length, the amplitude of the interference microphone is preferably a multiple of that of the pressure gradient microphone. In the small-angle end position of the mixing control element, the small-angle microphone is more sensitive in the direction of maximum sensitivity than the pressure gradient microphone having a wide angular field. When receiving diffused sound, both microphones pick up virtually the same amount of sound energy but in different angular fields.

In another case, e.g., for receiving sound from a wide sound source (choir, orchestra), it is more desirable to select an amplitude ratio of 1:1 in the small-angle end position of the mixing control element, when it is desired to select an individual sound source (solo instrument, singer). This adjustment may be effected by means of the control elements 3, 4.

Figure 7:
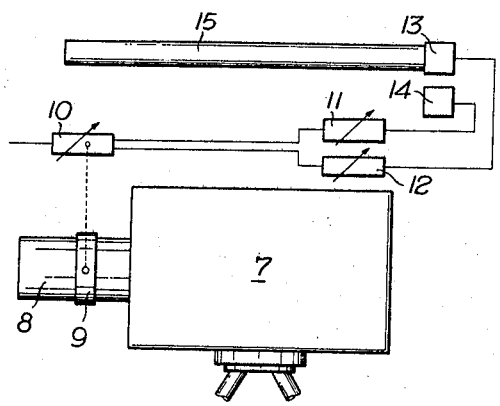
FIGS. 7 and 8 are diagrammatic views illustrating a microphone arrangement according to the invention in conjunction with a television camera.

In a particularly desirable embodiment of the microphone arrangement according to the invention, the same is combined with a television or sound motion picture camera, as is diagrammatically illustrated in FIGS. 7 to 10. FIG. 7 shows a camera 7, e.g., a television camera, which is provided with a zoom lens 8. The control element 9 provided on the lens 8 serves for changing the focal length. The microphone arrangement according to the invention, including two individual microphones 13, 14, is used in conjunction with the television camera. The control elements for adjusting the maximum amplitude ratio between the two microphone voltages are designated 11 and 12, are connected to a common mixing control element 10.

As is indicated in FIG. 7 by a dotted line, this mixing control element is connected by suitable means to the control element 9 for setting the focal length of the zoom lens 8. These connecting means may be of mechanical type and many comprise, e.g., a flexible shaft, a suitable other mechanism for transmitting rotation, a mechanism for transmitting a translatory movement, a gear-type transmission, or a mechanism similar to a lazy tongs or parallel motion mechanism.

The microphones may be mounted on a separate stand or on boom, and an operator must be assigned to adjust the microphone arrangement so that it has always the same direction as the camera. This operator is preferably provided with a picture monitor so that he can match exactly the direction of maximum sensitivity of the microphone arrangement to the optical axis of the camera. The need for the service of such an operator is no longer required if the microphone arrangement according to the invention is mounted on the camera itself.

Figure 8:
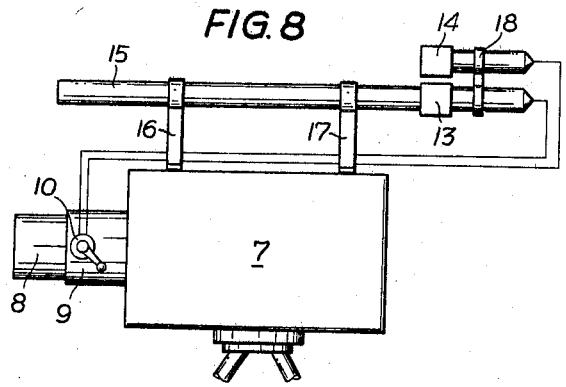

Such an arrangement is shown in FIG. 8. The two individual microphones 13, 14 are combined into a unit by a common holder or mount 18. The microphone assembly is supported at the directional tube 15 of the transducer 13. The longitudinal axis of this tube is parallel to the optical axis of the lens 8. The connection between the tube 15 and the camera 7 comprises two mountings 16, 17 which have resilient inserts to prevent a transmission of interfering noise from or through the camera body. For example, sandwich-type vibration-damping mountings may be used. The mixing control-element 10 and, if desired, the amplitude control elements 11, 12, may be incorporated in a housing, which is attached to the zoom lens.

In this case, the mixing control element 10 may be connected to the control element for setting the focal length of the lens, as in embodiment shown in FIG. 7. In the embodiment shown in FIG. 8, comprising a mechanical connection between the camera and microphone, the microphone leads, rather than extending to the control element coupled to the zoom lens, may extend to a control element located at any desired distance from the camera, suitably near a picture monitor, so that the desired sound source may be selected in accordance with the picture shown on the monitor.

Such an arrangement is shown in FIG. 9, in which like reference numbers designate parts similar to those of FIG. 7. The picture signal from camera 7 is applied to a monitor 19. The connection for supplying the picture signal from the camera to the monitor is indicated by a dash-dot line. The output of each microphone 13, 14 is connected to the control elements 11 and 12, and these control elements are connected to the mixing control element 10 as in FIG. 7. The control elements are mounted in the housing of the monitor 19, and are represented in FIG. 9 only by the knobs for adjusting them. Instead of providing one directional tube 15, a plurality of tubes having different lengths may be mounted before the diaphragm of the transducer 13.

FIG. 10 shows a television camera 7 having a zoom lens 8 provided with a control element 9 for setting the focal length of the lens. This control element is combined with a mixing control element 20 for the outputs of the microphones 13 and 14. The remaining connections of the output circuit of the microphones are not shown in FIG. 10, as they may be analogous to those illustrated in other figures of the drawings. The housing of control element 20 is provided with a distance scale, with which a mark on the control element 9 is associated. The control element 9 is coupled to the movable part of the mixing control element 20 to adjust the same.

FIG. 11 is a schematic electric circuit diagram of a microphone arrangement according to the invention, comprising two condenser microphones. A small-angle microphone 21 comprises an interference tube 15, a diaphragm 21 and a perforated electrode 22. A pressure gradient microphone 23 comprises a diaphragm 23 and a perforated electrode 24. The outputs of the microphones are applied to an amplifier tube 26 by a voltage divider 25. In each end position of the voltage divider, only the output of one or the other of the microphones is utilized. Intermediate ratios are obtainable in the intermediate positions of the voltage divider.

If the microphone arrangement according to the invention is used alone, it is desirable to provide the control elements with visual symbols and/or detent positions in order to facilitate the setting. For an indication of the angular field it would be sufficient to connect, to the control member for the mixing control element, an indicator which indicates the angular field as a sector of a circular disc. A further indicator may be provided in the form of a section of lazy tongs to represent the resulting sensitivity. Another desirable development is to provide the control member for determining the voltage ratio with a distance scale. The two control elements 11, 12 of the microphone arrangement according to the invention may be analogous to the focusing control element of the zoom lens.

In practical operation, it will be necessary only from time to time to set the control elements which determine the maximum amplitude ratio, either for matching the adjustment range of the zoom lens or for a solution to specific problems, e.g., to obtain reverberation effects.

Where a camera provided with a lens turret is used, the infinitely variable control elements are replaced by electric step switches, which are at least partly coupled to the lens turret and serve for changing the microphone voltages.

Thus, the invention affords a solution to all problems which arise from the simultaneous use of zoom lenses and microphones.

In this specification and the appended claims the ratio of the output voltages of the microphones is defined as the ratio of the output voltages produced by said microphones in response to sound from a source disposed in the direction of maximum sensitivity of the microphone having the smaller angular field.

What is claimed is:

1. A microphone arrangement comprising, in combination, a small-angle microphone having a directional pattern in the form of a lobe defining a small angular field; a wide-angle microphone having an angular field which is larger than, and includes, the angular field of said small-angle microphone; electric circuitry combining the outputs of said microphones; and means mounting said microphones in sufficiently closely adjacent relation to avoid significant interference between said microphones.

2. A microphone arrangement, as claimed in claim 1, in which said electric circuitry includes means for varying the ratio of the output voltages of said microphones.

3. A microphone arrangement, as claimed in claim 1, in which said wide-angle microphone has a unidirectional pattern and has the same direction of highest sensitivity as does said small-angle microphone.

4. A microphone arrangement, as claimed in claim 1, in which said wide-angle microphone is adjustable to a omnidirectional pattern.

5. A microphone arrangement, as claimed in claim 1, in which said wide-angle microphone is adjustable to a unidirectional pattern.

6. A microphone arrangement, as claimed in claim 1, in which said wide-angle microphone is adjustable to a cardioid directional pattern.

7. A microphone arrangement, as claimed in claim 1, in which said wide-angle microphone is adjustable between a unidirectional pattern and an omnidirectional pattern.

8. A microphone arrangement, as claimed in claim 1, in which said wide-angle microphone is adjustable between a cardioid directional pattern and an omnidirectional pattern.

9. A microphone arrangement, as claimed in claim 1, in which said small-angle microphone is an interference microphone; and said wide-angle microphone is a pressure gradient microphone having a cardioid directional pattern.

10. A microphone arrangement, as claimed in claim 1, in which said electric circuitry includes an amplifier having an input; and a voltage divider connected between the outputs of both of said microphones and said input.

11. A microphone arrangement, as claimed in claim 1, in which said electric circuitry includes control means determining the compound directional pattern of said microphone arrangement; and visual means on said control means for indicating the setting thereof.

12. A microphone arrangement, as claimed in claim 1, in which said electric circuitry includes settable control means varying the ratio of the output voltages of said microphones; and a distance scale operatively associated with an indicator on said control means.

13. A microphone arrangement, as claimed in claim 1, in which said electric circuitry includes control means determining the compound directional pattern of said microphone arrangement; and detent means operatively associated with said control means and operable to releasably retain the same in at least one intermediate position.

14. A microphone arrangement, as claimed in claim 1, in which at least one of said microphones is a condenser microphone; said electric circuitry including variable means applying a polarizing voltage to said one microphone to determine the sensitivity thereof.

15. A microphone arrangement, as claimed in claim 14, in which both of said microphones are condenser microphones; said electric circuitry including a high frequency oscillator and means operable to modulate the oscillator output with the outputs of said microphones.

16. A microphone arrangement, as claimed in claim 1, in which said electric circuitry includes respective means adjusting the outputs of said microphones for combining of the outputs in selectively different ratios.

17. A microphone arrangement, as claimed in claim 16, in which said electric circuitry comprises means for varying the ratio of the adjusted output voltages of said microphones as applied to the input of a common amplifier.

18. A microphone arrangement, as claimed in claim 17, in which said last-named means is operable to vary the ratio, of the output voltage of said small-angle microphone to that of said wide-angle microphone, over a range of 6:1 to 1:1.

References Cited

UNITED STATES PATENTS

| | | | |
|---|---|---|---|
| 2,286,540 | 6/1942 | Hanson | 178—7.1 |
| 2,854,511 | 9/1958 | Olson. | |
| 3,372,235 | 3/1968 | Weingartner. | |

KATHLEEN H. CLAFFY, Primary Examiner

CHARLES JIRAUCH, Assistant Examiner

U.S. Cl. X.R.

178—5.6; 179—138